(12) United States Patent
Carl

(10) Patent No.: US 9,251,627 B2
(45) Date of Patent: Feb. 2, 2016

(54) REMOVABLE DASHBOARD INSTRUMENT SYSTEM

(71) Applicant: Ross Carl, River Forest, IL (US)

(72) Inventor: Ross Carl, River Forest, IL (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 150 days.

(21) Appl. No.: 13/785,337

(22) Filed: Mar. 5, 2013

(65) Prior Publication Data

US 2014/0257623 A1 Sep. 11, 2014

(51) Int. Cl.
*G01S 13/94* (2006.01)
*G07C 5/00* (2006.01)
*G07C 5/08* (2006.01)
*H04W 4/04* (2009.01)
*B60K 37/00* (2006.01)
*G06Q 10/04* (2012.01)
*H04L 29/08* (2006.01)
*B60R 11/02* (2006.01)

(52) U.S. Cl.
CPC ............... *G07C 5/008* (2013.01); *G07C 5/0858* (2013.01); *H04W 4/046* (2013.01); *B60K 37/00* (2013.01); *B60R 11/02* (2013.01); *G06Q 10/047* (2013.01); *H04L 67/12* (2013.01)

(58) Field of Classification Search
CPC ............ G01C 21/34; G01C 21/3602; G01C 21/3623; G01C 21/3625; G01C 21/3647; G01S 13/94
USPC ............ 701/29.1, 29.4, 33.2, 33.4, 410, 412, 701/448, 491, 26, 50, 411; 700/253
See application file for complete search history.

(56) References Cited

U.S. PATENT DOCUMENTS

| | | | | |
|---|---|---|---|---|
| 5,648,769 A * | 7/1997 | Sato | ......................... | H04W 4/04 340/988 |
| 5,758,300 A * | 5/1998 | Abe | ......................... | G01M 15/05 455/424 |
| 6,363,632 B1 * | 4/2002 | Stentz | ..................... | E02F 3/437 37/348 |
| 6,459,969 B1 * | 10/2002 | Bates | ...................... | G07C 5/006 123/436 |
| 6,463,374 B1 * | 10/2002 | Keller | ................... | A01B 69/007 111/200 |
| 7,116,216 B2 * | 10/2006 | Andreasen et al. | ............ | 340/438 |
| 7,756,635 B2 * | 7/2010 | Milbert | .................. | G01C 21/20 701/416 |
| 7,900,988 B2 * | 3/2011 | Ryu | ...................... | B60R 11/0235 224/483 |
| 8,024,094 B2 * | 9/2011 | Furuno | ................... | G06Q 10/00 701/29.4 |
| 8,364,334 B2 * | 1/2013 | Au | ......................... | G01C 21/165 701/23 |
| 8,370,020 B2 * | 2/2013 | Bauman | ................ | G07C 5/008 340/426.15 |
| 8,428,305 B2 * | 4/2013 | Zhang | ................... | B60W 30/00 382/103 |

(Continued)

*Primary Examiner* — Thomas G Black
*Assistant Examiner* — Sara Lewandroski
(74) *Attorney, Agent, or Firm* — McAndrews, Held & Malloy, Ltd.

(57) ABSTRACT

An instrument system for a vehicle in which information regarding the operation of the vehicle is displayed on the display of a portable communication device. Information regarding the operation of the vehicle may be sensed by at least one sensor. The sensed information may be communicated to a vehicle controller and/or transmitted to the portable communication device. The sensed information may be used by the vehicle controller and/or the portable communication device to derive information regarding the performance or operation of the vehicle and displayed on the display. The portable communication device may also retrieve or derive other information relating to the operation of the vehicle, such as information obtained from a remote server, and display the additional information for the user of the vehicle. The vehicle may be configured to receive the secure placement of the portable communication device in the vehicle, such as on a dashboard.

11 Claims, 6 Drawing Sheets

(56) References Cited

U.S. PATENT DOCUMENTS

| | | | | | |
|---|---|---|---|---|---|
| 8,504,285 B2* | 8/2013 | Vepsalainen | G01C 21/3453 701/410 |
| 8,543,289 B2* | 9/2013 | Owens | B60K 35/00 455/343.2 |
| 8,550,529 B2* | 10/2013 | Clochard | B60R 11/02 224/483 |
| 8,565,984 B2* | 10/2013 | Mayfield | A01B 69/008 701/1 |
| 8,775,069 B1* | 7/2014 | Kabel | G01C 21/20 340/944 |
| 2005/0018392 A1* | 1/2005 | Strohmeier | B60R 11/0205 361/679.55 |
| 2006/0017552 A1* | 1/2006 | Andreasen | B60K 35/00 340/438 |
| 2007/0138822 A1* | 6/2007 | Feit | B60K 35/00 296/70 |
| 2009/0076674 A1* | 3/2009 | Kiegerl | E02F 1/00 701/26 |
| 2009/0222203 A1* | 9/2009 | Mueller | G01C 21/3647 701/431 |
| 2009/0259361 A1* | 10/2009 | Tuff | G01P 1/07 701/31.4 |
| 2009/0271239 A1* | 10/2009 | Underdal | G01M 15/02 705/7.12 |
| 2010/0030473 A1* | 2/2010 | Au | G06K 9/00791 701/301 |
| 2010/0106356 A1* | 4/2010 | Trepagnier | G01S 17/023 701/25 |
| 2010/0182157 A1* | 7/2010 | Shaffer | H04Q 9/00 340/636.13 |
| 2011/0153150 A1* | 6/2011 | Drew | G07C 5/0808 701/31.4 |
| 2011/0256905 A1* | 10/2011 | Ryan | G06F 1/1632 455/556.1 |
| 2011/0313653 A1* | 12/2011 | Lindner | G01C 21/3632 701/523 |
| 2012/0010774 A1* | 1/2012 | McQuade | G08G 1/20 701/29.6 |
| 2012/0028680 A1* | 2/2012 | Breed | B60N 2/002 455/556.1 |
| 2012/0232787 A1* | 9/2012 | Kunath | G01C 21/3461 701/423 |
| 2013/0006525 A1* | 1/2013 | Stroila | G01C 21/20 701/434 |
| 2013/0079990 A1* | 3/2013 | Fritsch | G06T 7/0087 701/41 |
| 2013/0238182 A1* | 9/2013 | Osagawa | G05D 1/0274 701/26 |
| 2013/0317979 A1* | 11/2013 | Marathe | B60L 11/1838 705/39 |
| 2014/0018996 A1* | 1/2014 | Mian | G05D 1/0212 701/26 |
| 2014/0046531 A1* | 2/2014 | Mohn | G08G 1/00 701/29.1 |
| 2014/0100738 A1* | 4/2014 | Itatsu | G07C 5/0825 701/33.4 |
| 2014/0121893 A1* | 5/2014 | Larschan | G07C 5/0825 701/33.4 |
| 2014/0180531 A1* | 6/2014 | Lipscomb | G07C 5/008 701/33.2 |
| 2014/0188388 A1* | 7/2014 | Malahy | G01C 21/367 701/533 |
| 2014/0244110 A1* | 8/2014 | Tharaldson | G07C 5/008 701/36 |
| 2014/0379208 A1* | 12/2014 | McQuade | G06Q 10/0838 701/33.2 |

* cited by examiner

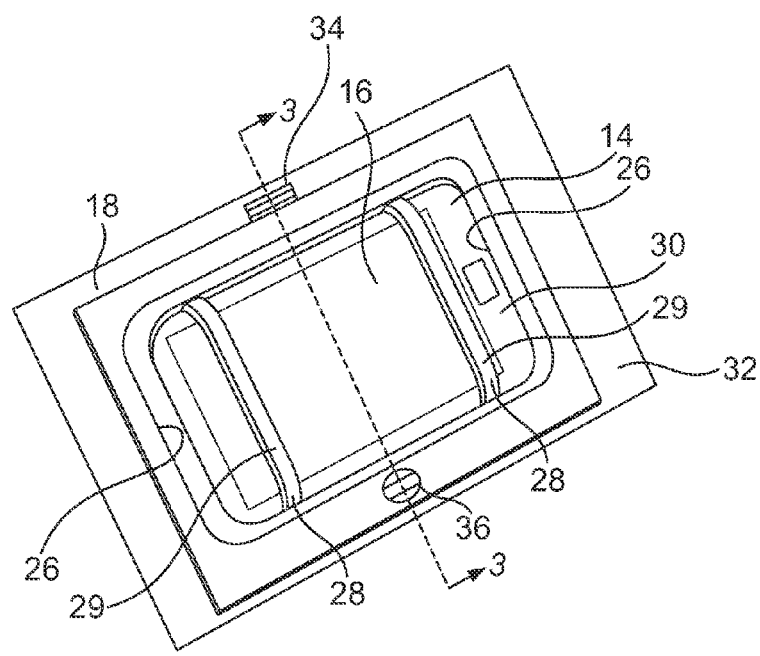
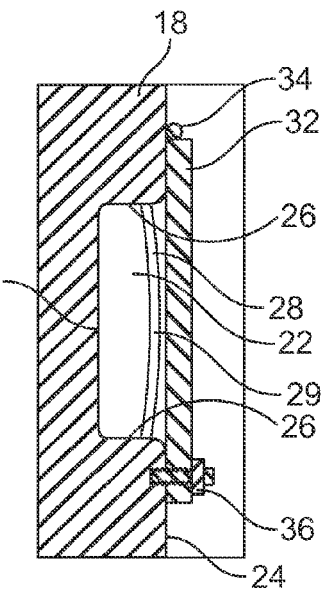
FIG. 2　　　　　　FIG. 3
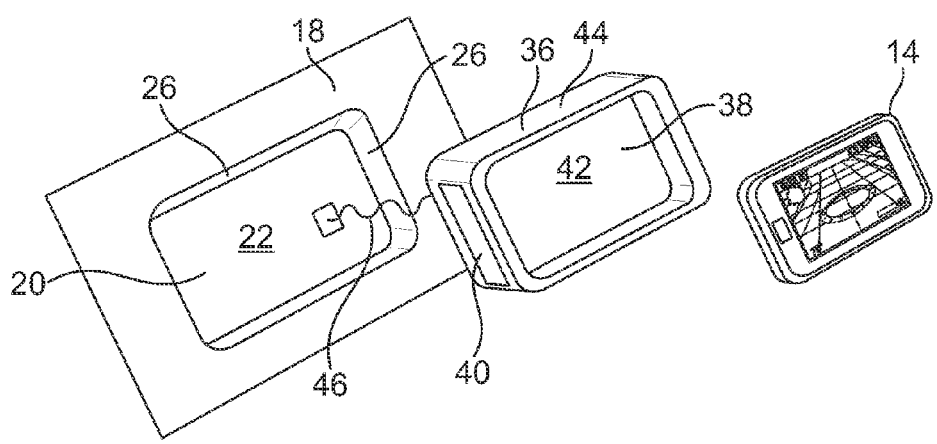
FIG. 4

REMOVABLE DASHBOARD INSTRUMENT SYSTEM

RELATED APPLICATIONS

BACKGROUND OF THE INVENTION

The present invention relates to dashboards for motorized vehicles, and more specifically, the use of a portable communications device to display and/or provide vehicle operational information, among other information, to an operator of the vehicle.

Vehicle displays typically provide vehicle operational information, such as, for example, vehicle speed and engine temperature. The inclusion of such displays in a vehicle generally requires significant design, tooling, manufacturing, and equipment expenses. For example, the dashboard typically needs to be designed and manufactured to provide the requisite space and/or fittings for the placement of an instrument panel and/or associated gauges or displays. Further, each gage may be separately wired or otherwise connected to a wire or cable that delivers signals or information to each gage. Further, different instruments panels may be required, or existing panels may need to be designed, for the inclusion of additional gauges that may be provided with the purchase of enhanced vehicle models, trim packages, or other purchased options. Further, over the course of time, the instrument panels and associated portions of the dash may be redesigned to indicate the introduction of a new or modified vehicle model onto the market. However, such design considerations and changes, as well as the manufacturing and assembly of the dashes, instruments panels, and gauges, may increase the complexity and expense of the vehicle.

BRIEF SUMMARY OF THE INVENTION

According to certain embodiments of the present invention, an instrument system is provided for displaying information for a vehicle on a display of a portable communication device. The instrument system includes at least one sensor that is configured to sense information regarding the operation of the vehicle and provides the information to a transmitter. The transmitter may be configured to the sensed information to the portable communication device for display on the display of the portable communication device.

According to another embodiment of the present invention, an instrument system is provided for displaying information for a motorized vehicle on a display of a portable communication device. The instrument system includes a vehicle controller positioned in the motorized vehicle, the vehicle controller having a processor. The system also includes at least one sensor that is configured to provide information regarding the operation of the motorized vehicle to the vehicle controller. The vehicle controller is configured to control the transmission of information relating to the information sensed by the at least one sensor to the portable communication device for display on the display of the portable communication device.

According to another embodiment of the present invention, an instrument system for a motorized vehicle is provided that includes a portable communication device having a display and a controller. The controller includes a processor that is configured to control the display of information on the display. The system also includes an instrument application that is configured to run on the portable communication device. Additionally, the portable communication device is configured to receive information regarding the operation of the vehicle from a vehicle transmitter. Further, the instrument application enables display of the information on the display of the portable communication device.

BRIEF DESCRIPTION OF SEVERAL VIEWS OF THE DRAWINGS

FIG. 2 illustrates a perspective view of a portion of a removable dashboard for a motorized vehicle according to certain embodiments of the invention.

FIG. 3 illustrates a cross section taken along line 3-3 in FIG. 2 but with the portable communication device removed from the dashboard.

FIG. 4 illustrates an embodiment of a removable dashboard having a housing for a portable communications device that fits within a pocket of the dashboard.

Figure 1:
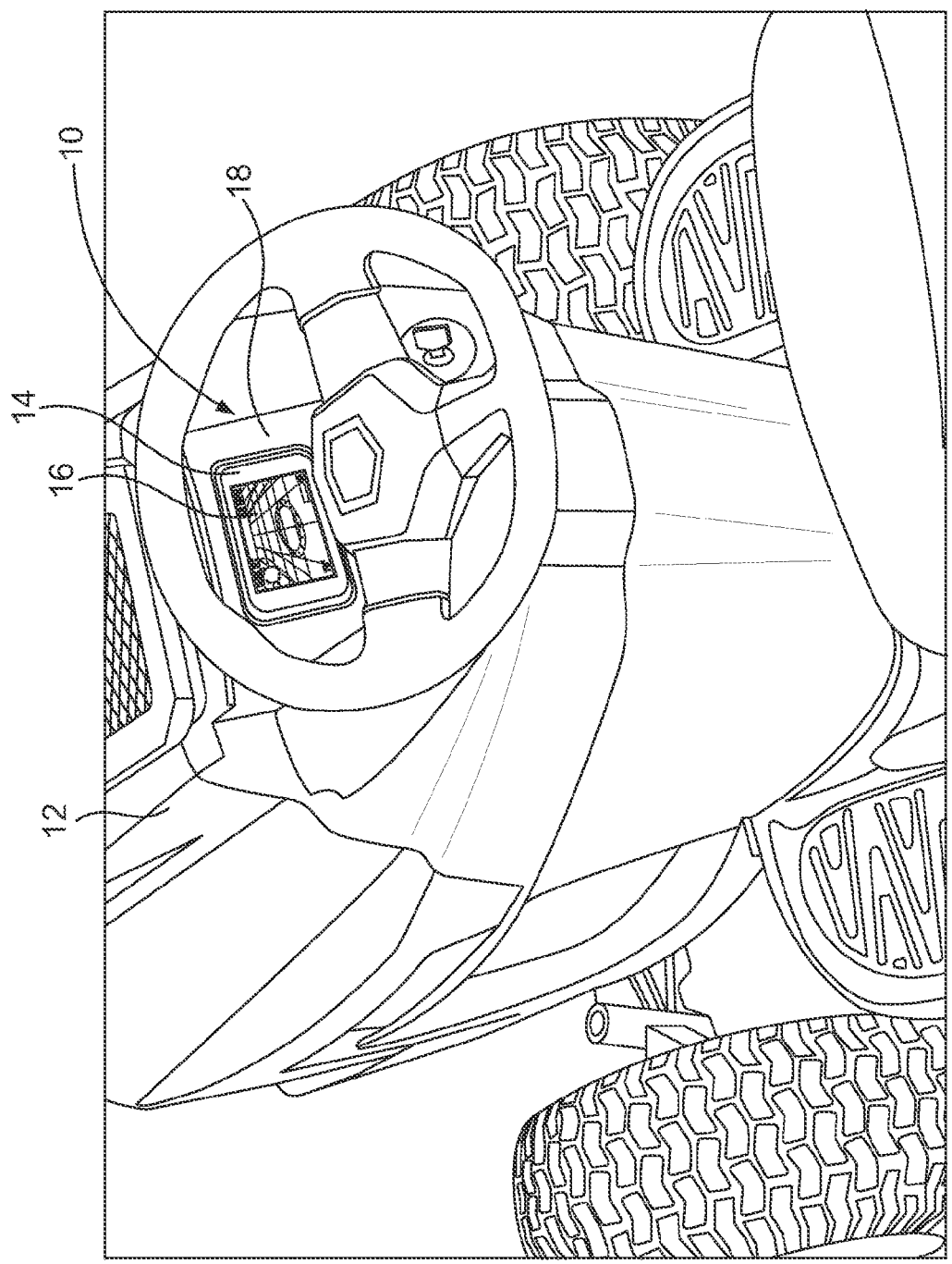
FIG. 1 illustrates a perspective view of a removable dashboard for a motorized vehicle according to certain embodiments of the invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates a perspective view of a removable dashboard instrument system 10 on a motorized vehicle 12 according to certain embodiments of the invention. The motorized vehicle 12 illustrated in FIG. 1 is a landscaping device, namely a riding mower or tractor. However, embodiments of the present invention may be used with a variety of motorized vehicles 12, such as vehicles having internal combustion or battery powered engines, among others, including, for example, recreational vehicles, all-terrain vehicles, snowmobiles, and construction equipment.

The dashboard 18 of the vehicle 12 is configured to receive the placement of the portable communications device 14, including, for example, a portable electronic device having the capability to access the Worldwide Web, such as, for example, a mobile telephone that is built on a mobile operating system and which has the capability for wireless communication, or a global positioning device, among others. As discussed below, the portable communication device 14 includes a display 16 that is used to display information to the operator of the vehicle 12, such as, for example, information regarding the operation and/or performance of the vehicle 12, among other information. According to certain embodiments, the display 16 may also provide hi-resolution of images and information.

The dashboard 18 of the vehicle 12 may be adapted for the portable communication device 14 to be secured to the vehicle 12. For example, referencing FIGS. 2 and 3, the vehicle 12 may include a base portion 20 against which a back side of the portable communication device 14 may abut when the portable communication device 14 is placed on the dashboard 18. Additionally, according to certain embodiments, the dashboard 18 may include a recess or pocket 22 that is configured to receive the insertion of, and/or retain, the portable communication device 14. The pocket 22 may include inner walls 26 that extend from the base 20 toward the outer surface 24 of the dashboard 18. Moreover, the pocket 22 may be sized to provide at least some degree of shelter to the portable communication device 14 from the surrounding environment and/or to at least assist in securing the portable communication device 14 to the dashboard 18. For example, in the illustrated embodiment, at least a portion of the base portion 20 is recessed into the dashboard 18 to provide a pocket 22 so that at least a portion of the portable communication device 14, when in the pocket 22, is recessed from an outer surface 24 of the dashboard 18. However, according to other embodiments, the base portion 20 may be generally aligned with the outer surface 24 of the dashboard 18.

According to certain embodiments, the removable dashboard instrument system 10 may also include a securement mechanism 28 that at least assists in securing the portable communication device 14 to the dashboard 18. For example, according to the embodiment illustrated in FIGS. 2 and 3, the securement mechanism 28 may be one or more straps 29 that secure the portable communication device 14 against the base portion 20. According to such an embodiment, the straps may be elastic so that the straps 29 may be stretched and/or deformed when the portable communication device 14 is being placed against, or removed from, the dashboard 18, and provide a force that biases the portable communication device 14 against the base portion 20. Such elastic properties of the straps 29 may also allow the securement mechanism 28 to be adaptable to securing to the dashboard 18 portable communication devices 14 having variety of different widths, shapes, and/or configurations without needing to adjust the size or shape of the securement mechanism 28. According to other embodiments, the securement mechanism 28 may be adjustable, such as, for example, the straps 29 may be similar to belts that may be adjustable to either shorten or increase the length of the strap 29. Numerous other securement mechanisms 28 may also be employed, including, for example, one or more tabs that engage an upper surface 30 of the portable communication device 14 so as to prevent or limit the movement of the portable communication device 14 relative to the base portion 20.

According to certain embodiments, the dashboard 18 of the vehicle 12 may also include an at least partially transparent shield 32 that covers at least a portion of the portable communication device 14 when the portable communication device 14 is secured to the dashboard 18. According to certain embodiments, the shield may be a visor that is configured to limit and/or reduce glare on the display 16 of the portable communication device 14. Further, according to certain embodiments, the shield 32 may protect at least a portion of the portable communication device 14 from dust, debris, and other materials that the portable communication device 14 may otherwise encounter during, or by, the operation of the vehicle 12. The shield 32 may be connected to the dashboard 18 by a variety of different mechanisms, including, for example, by a hinge 34, among others. The hinge 34 may be operably connected to both the shield 32 and the dashboard 18 so that the shield 32 may be pivoted from a closed position, wherein the shield 32 is at least partially covering the portable communication device 14, to an open position, wherein the shield 32 is displaced away from the portable communication device 14. Additionally, the shield 32 may be secured in the closed position by a latch 36, including, for example, a pin, among other latches.

Referencing FIG. 4, according to another embodiment, the securement mechanism 28 may be a housing 36 having an interior portion 38 that is configured to receive the insertion of the portable communication device 14, and an outer portion 44. According to certain embodiments, the housing 36 may also include an opening 40 configured to allow the portable communication device 14 to pass into, and pass out of, the interior portion 38. The housing 36 may also include an at least partially transparent shield 42 that allows the display 16 of a portable communication device 14 that is viewable and/or readable by a user when the device 14 is in the housing 36. The shield 42 may also protect the display 16 and/or device 14 from dust, debris, and other materials that the portable communication device 14 may otherwise encounter during or by the operation of the vehicle 12.

The outer portion 44 of the housing 36 may be configured to be placed and/or secured within the pocket 22 and/or against the dashboard 18. For example, according to certain embodiments, the outer portion 44 may be configured for a press or snap fit within the pocket 22. According to other embodiments, the housing 36 may be configured to latch or otherwise be mechanically locked and unlocked, as desired, from, the dashboard 18. Additionally, the housing 36 may retain a connection with the dashboard 18, such as, for example, by a tether 46 or other cord that is connected to both the housing 36 and the dashboard 18.

Figure 5:
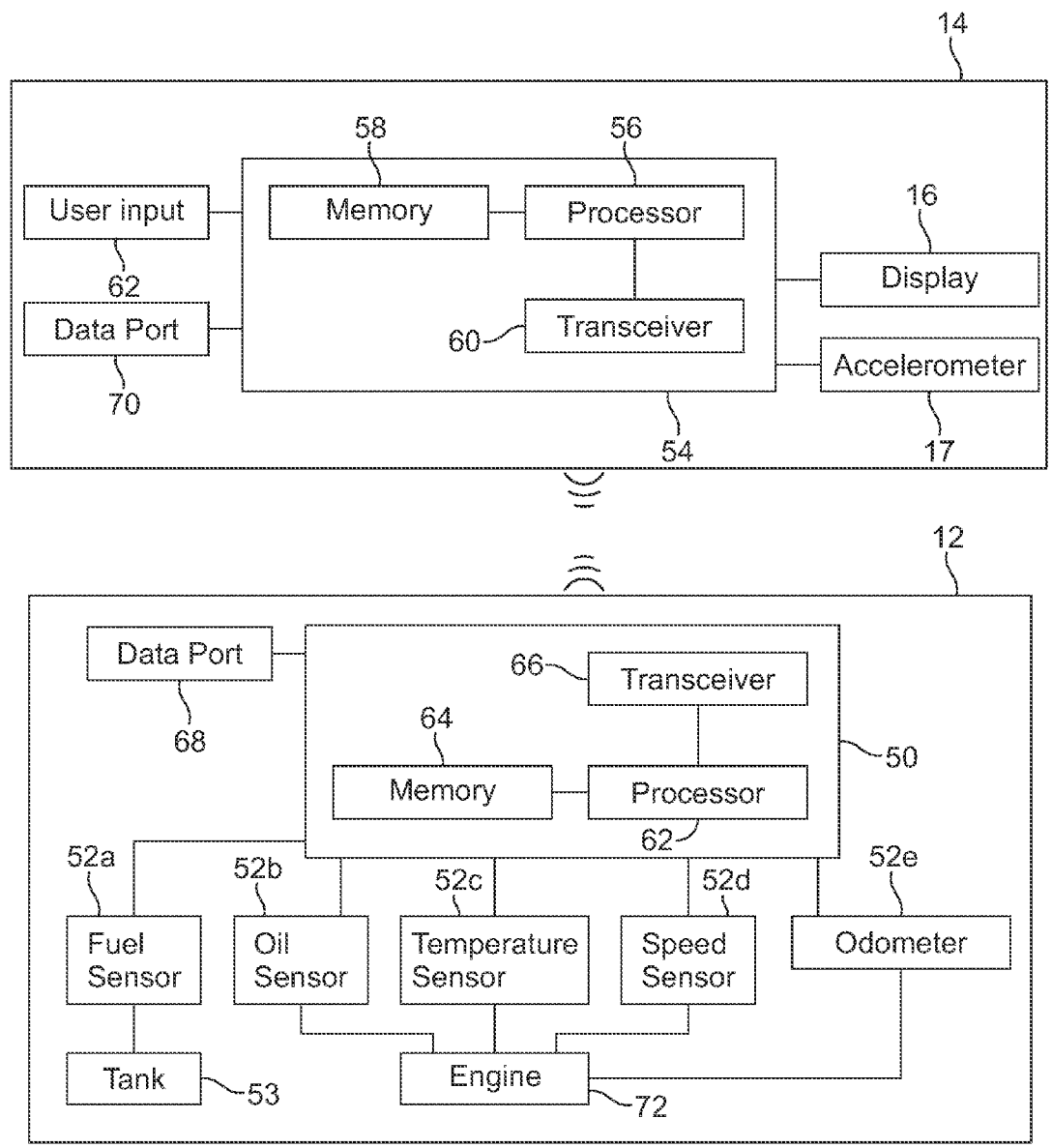
FIG. 5 illustrates a block diagram of a portable communication device and the controller and sensors of a motorized vehicle for a removable dashboard instrument system according to certain embodiments of the invention.

FIG. 5 illustrates a block diagram of a portable communication device 14 and a vehicle controller 50 and sensors 52 of a motorized vehicle 12 for a removable dashboard instrument system 10 according to certain embodiments of the invention. As shown, the portable communication device 14 includes a controller 54 having a processor 56, a memory 58, and a transceiver 60. The memory 58 may or may not be part of the processor 56. The memory 58 may store programing, instructions, or other information that is used or executed by the processor 56. Suitable memories 58 include, but are not limited to, permanent memory, RAM, ROM, or a hard drive, among others.

The controller 54 of the portable communication device 14 may also be configured to utilize applications that may or may not be stored in the memory 58, including, for example, applications utilized by smartphones relating to global positioning systems (GPS), among others. The controller 54 may also control the display 16, and in particular, the display of images and/or information on the display 16. Additionally, the controller 54 may be in communication with a user input 62, such as a button, keypad, and/or touch screen, among others. The user input 62 may allow for input from the user to the controller 54, such as, for example, for the user to select what information is to be displayed on the display 16, or to input data or other information into the portable communication device 14.

The controller 50 of the motorized vehicle 12 includes a processor 62, a memory 64, and a transceiver 66. The memory 64 may or may not be part of the processor 62. The memory 64 may store programing, instructions, or other information that is used or executed by the processor 62. The controller 50 may also be configured to utilize applications that may or may not be stored in the memory 64. According to certain embodiments, the memory 64 may be a non-transitory computer-readable storage medium. Suitable memories 64 include, but are not limited to, permanent memory, RAM, ROM, or a hard drive, among others.

The transceiver 66 of the controller 50 for the motorized vehicle 12 may be configured to send and/or receive wireless signals to/from the transceiver 60 of the controller 54 of the portable communication device 14. Additionally, the controller 50 may also include a data port 68, such as, for example, a port or cable that may be used in the delivery of information from the controller 50 to the portable communication device 14, another system, device, machine, or other non-transitory computer-readable storage medium. For example, the data port 68 may be a USB port that allows for a wired connection with a data port 70 of the portable communication device 14.

Additionally, the memory 58, 64 of the portable communication device 14 and/or motorized vehicle may store information regarding usage of the motorized vehicle 12. Such information may be used to capture data, such as data regarding the operation, performance, and usage of the motorized vehicle 12 that may be communicated to a remote location, such as a remote server, through the portable communication device 14, such as, for example, by the ability of the portable communication device 14 to access the internet.

According to certain embodiments, the controller 50 of the motorized vehicle 14 is operably connected to at least one sensor 52 in the motorized vehicle 12 that provides information relating to the operation, performance, and/or maintenance of the vehicle 12 and/or the engine 72. Such connection between the controller 50 and the sensors 52 may include a wired connection and/or a wireless connection, including, for example, through the use of a Bluetooth enumerator bus. However, according to other embodiments, the sensor 52 may include a transmitter, such as a smart sensor, that allows for the transmission of information sensed by the sensor 52 to the controller 50 of the vehicle 12, or to the portable communication device 14.

A variety of sensors 52 provide information to the controller 50 that indicates, either directly or through the use of at least one of the controllers 50, 54, the operation, performance, and/or status of the vehicle 12, among other information. For example, according to the embodiment illustrated in FIG. 5, the controller 50 may be operably connected to a fuel sensor 52*a* that may provide a signal relating to the quantity of fuel that is in a fuel tank 53 of the motorized vehicle 12. Further, as shown, the controller 50 may also be operably connected to an oil sensor 52*b*, which may provide information or a measurement relating to the oil level in the engine 72. The controller 50 may also be operably connected to a temperature sensor 52*c*, such as, for example, a thermocouple that is attached to an engine block. A speed sensor 52*d* may be used to provide a signal relating to engine speed. A speed sensor may also be employed to provide information pertaining to the speed at which the vehicle 12 is traveling. A sensor 52*e* may also be used to provide information or data relating to the distance that the vehicle 12 has traveled, such as odometer, or the number of hours that an engine 72 has operated.

Information or data provided by the sensors 52 may be used by the processor 62 of the controller 50 of the vehicle 12 and/or the processor 56 of the controller 54 to derive information regarding the operation and/or performance of the vehicle 12 and/or engine 72, among other information. For example, the speed sensor 52*c* may provide information or a measurement that is obtained through the use of an inductive pick-up that is wrapped around a spark plug wire, with the sensed information being used by the controller 50 to determine the speed of the engine 72 in terms of revolutions per minute. Alternatively, transceiver 66 of the controller 50 of the vehicle 12 may transmit data corresponding to the signals from the inductive pick-up to the transceiver 60 of the controller 54 of the portable communication device 14, wherein the processor 62 of the controller 54 may use the transmitted inductive pick-up data to determine engine speed. Such transmission may take a variety of different forms, including, for example, being a Bluetooth data transmission. According to such an embodiment, the controller 54 may have previously downloaded a program or application that provides the controller 54 with information that may be necessary for the controller 54 to derive information received from the controller 50 of the vehicle 12 regarding the operation of the vehicle 12 and/or engine 72.

The processor 56 of the controller 54 may then determine whether to display information derived by either or both processors 56, 62 on the display 16. According to certain embodiments, certain information may be automatically be displayed on the display 16 by the processor 56, such as, for example, when engine temperature exceeds an upper temperature limit and/or the engine oil level falls below a predetermine threshold. Other information may be displayed by selection of the user, such as through operation of the user input 62. For example, through use of user input 62, the user may toggle between displays on the display 16 that provide various types of information relating to the operation or performance of the vehicle 12 and/or engine 72. The information may be displayed in numerous different manners, including, for example, by replicating a traditional fuel gage needle positioned between full and empty end points, or a digital read-out of specific information, among others.

Figure 6:
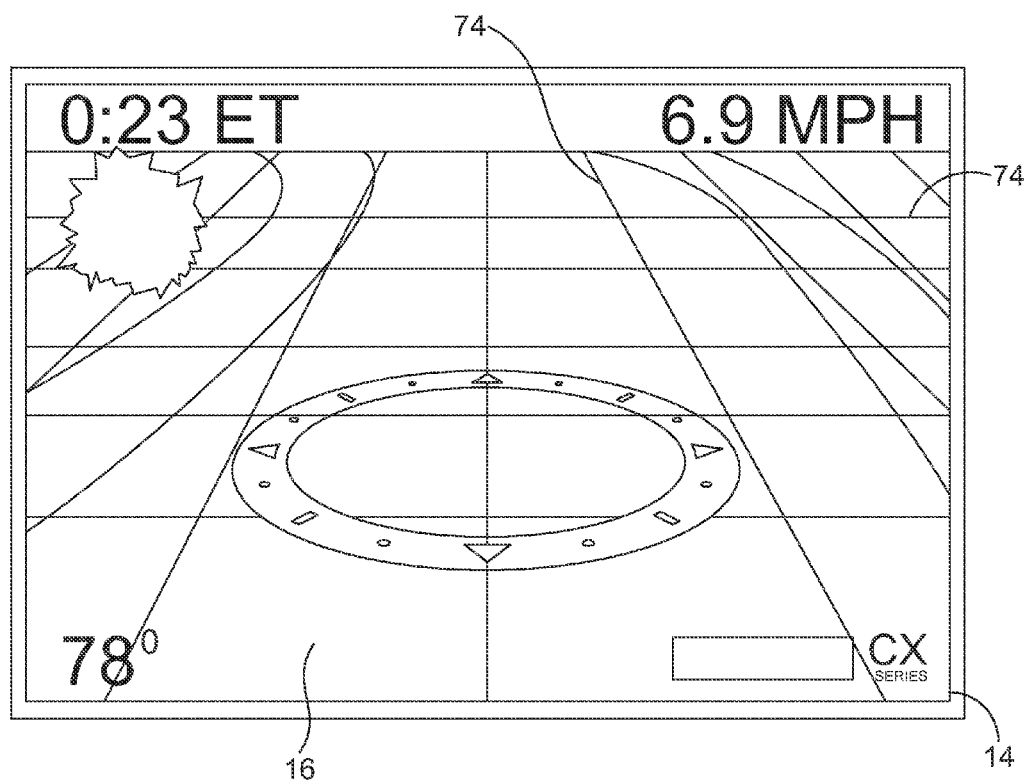
FIG. 6 illustrates a sample of a display of a portable communication device that is displaying a variety of different operational information to the user of the vehicle according to an illustrated embodiment.

According to certain embodiments, the user may pre-set default information to be automatically displayed on the display 16, such as the fuel level and engine temperature, among other information. Information that may be displayed on the display 16 includes, but is not limited to: engine speed, vehicle speed, an odometer, distance traveled during current use of the vehicle 12, engine temperature, and air temperature, among other information. Additionally, the display 16 may also display information that is obtained through the use of the portable communication device 14, such as the ability of the portable communication device 14 to access a remote server through the use of the internet, with or without information received from the controller 50 of the vehicle 14, such as, for example: a clock; elapsed time during current operation of the vehicle 12; a compass; the location of the vehicle 12 (such as through the use of GPS); the speed at which the portable communication device 14 and/or vehicle 14 is traveling; a map of the terrain on which the vehicle 12 is operating; the gradient of the terrain; site hazard warnings; mowing progress; sector information regarding terrain the vehicle is being operated on, including, for example, the and dates, times, and/or locations of sectors of the terrain that will be/were watered and/or fertilized; among other information. Additionally, the portable communication device 14 may be configured to receive a variety of other information from a remote server, such as, information regarding product offerings and updates for applications or programs being used for the controller 54 to derive information received from the controller 50 of the vehicle 12, and vice versa FIG. 6 illustrates a sample of a display 16 of a portable communication device 14 that is displaying a variety of different operational information to the user of the vehicle according to an illustrated embodiment, including, for example, navigational information. Various types of displays 16 may be employed, including displays that allow for hi-resolution images, including hi-resolution mapping of the area in which the vehicle 12 will be, or is being, operated. As shown, the display 16 displays the engine speed ("6.9 MPH"), outside temperature ("78°"), and elapsed time ("0:23 ET"). As previously discussed, according to certain embodiments, this speed may be derived by the controller 50 of the vehicle 12 using information provided by a speed sensor. However, according to other embodiments, the speed of the vehicle 12 may be derived by an application on the portable communication device 14, such as, for example, an application that is able to use changes in positional information, such as positional information obtained by a GPS, over time to determine a rate of speed, or by an accelerometer 17. The display 16 may also provide a plurality of gradient lines 74 to provide the user of the vehicle with information regarding the slope, or lack thereof, of the terrain over which the motorized vehicle 12 is traveling. The display 16 shown in FIG. 6 also displays a compass 76. Again, the compass 76 may be provided by an application on, or accessible by, the controller 54 and/or may be communicated to the controller 54 from the controller 50 of the vehicle 12.

Figure 7:
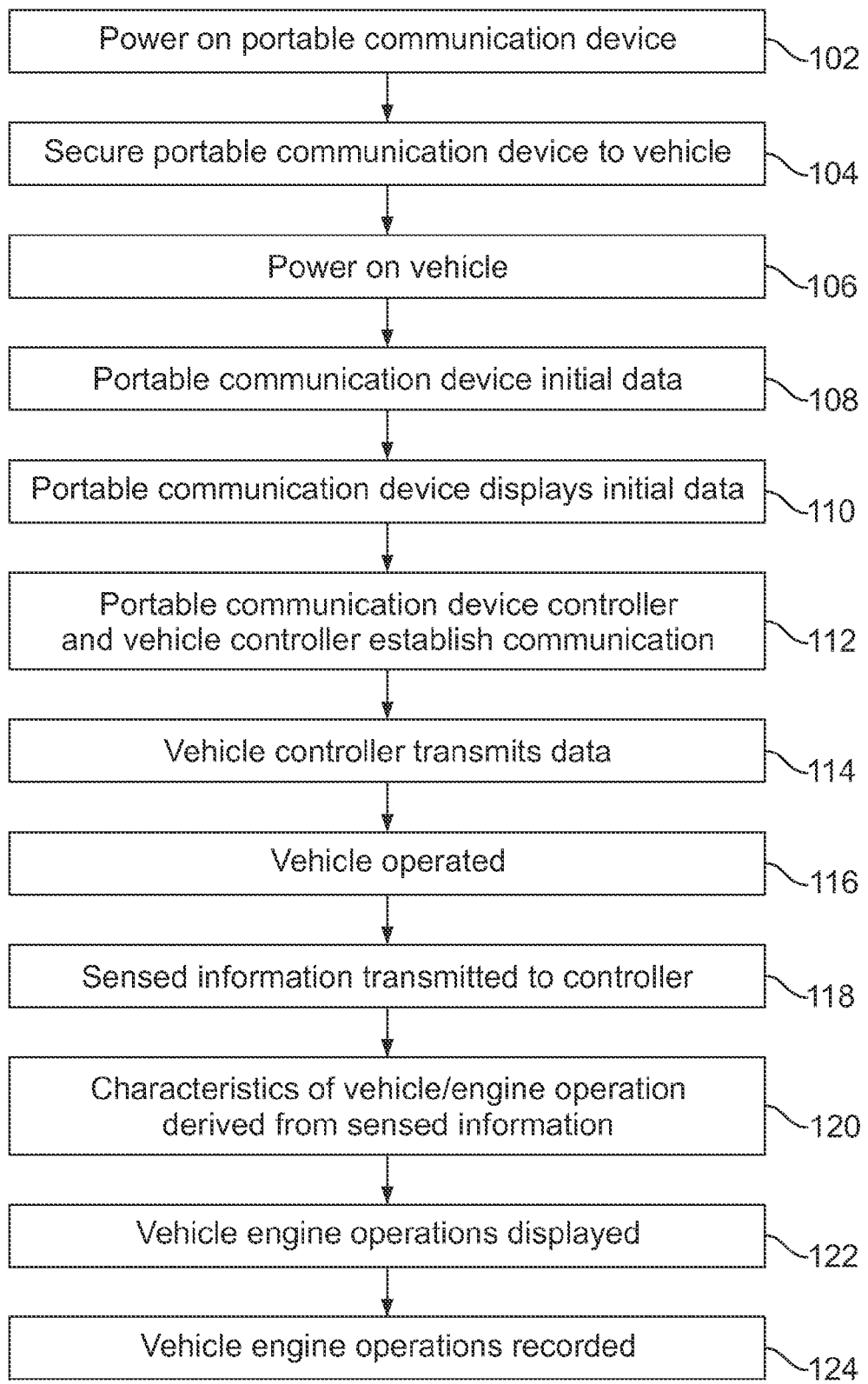
FIG. 7 provides a flow diagram illustrating an example of the operation of the removable dashboard system according to certain embodiments of the invention.

FIG. 7 provides a flow diagram illustrating an example of the operation of the removable dashboard instrument system 10. Although the operation is described below in a particular order, the order of at least some of the steps described below may be altered. Additionally, at least some of the steps may be modified, removed, and/or replaced. At step 102, the portable communication device 14 may be powered on, such as by pressing a power button on the portable communication device 14. At step 104, the portable communication device 14 may be secured to the dashboard 18 of the vehicle 12, such as, for example, through the use of the previously discussed securement mechanism 28 and/or housing 36, at a position that allows the operator of the vehicle 12 to be able to view the display 16. At step 106, the vehicle 12 may be turned on, such as, for example, by turning an ignition key of the vehicle 12 to an accessory, on, and/or start position. At step 108, the portable communication device 14 may acquire at least some of the information that may displayed and/or used to the derive information that is displayed during operation of the vehicle, including, for example, the location of the device 14 using a GPS, temperature, time, and/or land gradient information. This information, and the corresponding display of the information on the display 16, may also be updated by the portable communication device 14 on a continuous or semi-continuous basis during the course of usage of the vehicle 12.

At step 110, the portable communication device 14 may display on the display 16 at least some of the information obtained by the portable communication device 14, such as, for example, a temperature of "78°," the compass 76, and the gradient lines 74 shown in FIG. 6. The format of the information displayed on the display 16 may be determined through the use of an application or program that is formatted for the portable communication device 14 and for use with the vehicle 12. At step 112, the controller 54 of the portable communication device 14 and the controller 50 of the vehicle 12 may establish communication with each other, such as, for example, via a wireless communication through, for example, the transceivers 60, 66, and/or a wired connection that utilizes the data ports 68, 70. For example, according to certain embodiments, the transceivers 60, 66 may be Bluetooth transceivers. At step 114, the vehicle controller 50 may communicate information to the controller 54 of the portable communication device 14. Such information may include information relating to the maintenance of the vehicle, such as an indication of the timing of the next suggested (or overdue) oil or oil filter change, blade sharpening, or blade change. Such information may be based on calendar dates and/or vehicle usage 12, such as vehicle 12 usage that has been recorded by the memory 64 of the controller 50. Additionally, other information relating to the area that the vehicle 12 will be operated may be provided, such as, for example, watering and/or fertilization dates and/or sectors for landscaping vehicles 12. The transmitted information may also be displayed on the display 16 either automatically or at the request of the user.

At step 116, the vehicle 12 may be operated. During and/or before operation of the vehicle 12, information sensed by the one or more sensors 52 may be provided to either of the controllers 50, 54 at step 118. At step 120, the information from the sensors 52 may be used by at least one of the controllers 50, 54 to derive information regarding the operational characteristics or performance of the vehicle 12 and/or engine 72, such as a determination of the engine speed and fuel level, among others. As previously discussed, according to certain embodiments, at least some determinations regarding operational/performance characteristics using information from the sensors 52 may be made by the controller 50 of the vehicle 12, with the resulting determinations being transmitted to the controller 54 of the portable communication device 14. Further, according to certain embodiments, the controller 50 may control the sending of at least some of the information sensed by the sensors 52 to the controller 54 of the portable communication device 14, thereby allowing the controller 54 of the portable communication device 14 to determine the operational/performance characteristics using information from the sensors 52. At step 122, the operational/performance characteristics information derived by the vehicle controller 50 and/or controller 54 of the portable communication device 14 may be displayed, or available for display, on the display 16. Additionally, at step 124, at least a portion of the engine operation information sensed by the sensors 52 and/or derived by the controllers 50, 54 may be stored on the memories 58, 64 of the vehicle controller 50 and/or the controller 54 of the portable communication device 14. Such recording of information may be subsequently used to maintain a record of the operation of the vehicle 12, such as, for example, information that may be used in connection with a maintenance schedule for the vehicle 12 and/or information regarding the terrain on which the vehicle 12 was operated, among other information.

Additionally, according to certain embodiments, the ability of the portable communication device 14 to obtain positional information, such as by access to the GPS, for a selected area for operation of the vehicle 12 may allow the portable communication device 14 to predict an optimal path of travel for the vehicle 12. Moreover, according to certain embodiments, the portable communication device 14 may include a photographic and/or video camera that allows the portable communication device 14 to record visual information as to the terrain on which the vehicle 12 is operating. Such recorded information may be analyzed by the portable communication device 14, such as by the controller 54, to suggest a direction and path of travel for the vehicle 12. For example, from stored and/or recorded terrain information obtained through operation of the photograph and/or video camera of the portable communication device 14, and/or from, the GPS, the controller 54 may determine a course of direction for traveling up, down, and/or around inclined surfaces and/or obstructions, among other surfaces. Additionally, according to certain embodiments, the ability to store and/or record terrain information through use of the photographic and/or video camera of the portable communication device 14, as well as the ability of the portable communication device 14 to access a GPS, may allow for the portable communication device 14 to map a preferred route across and/or along the terrain. For example, according to certain embodiments, the user of the portable communication device may use the GPS to identify the area or boundary that the vehicle 12 is to operate. The controller 54 may then use terrain information provided by the GPS and/or recorded or stored on/by the photographic and/or video camera of the portable communication device 14 to determine a course of travel. A variety of different paths of travel may be determined. For example, according to embodiments in which the vehicle 12 is a lawn mower or tractor, the portable communication device 14 may use information from the GPS and/or photographic and/or video camera to determine the fastest and/or safest route for cutting the grass.

Figure 8:
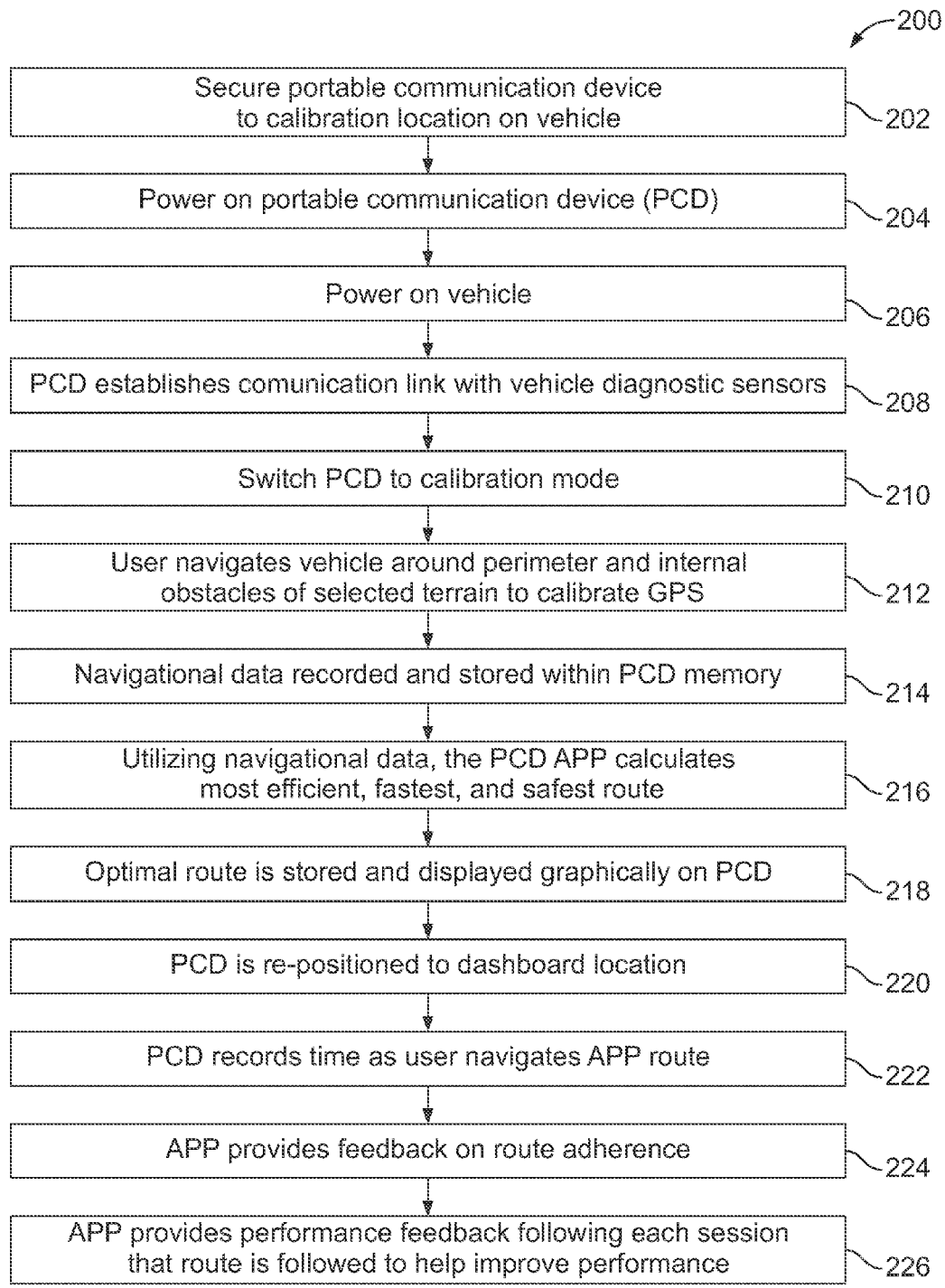
FIG. 8 is flow diagram illustrating an example of the operation of the removable dashboard instrument system in obtaining information to determine terrain information and provide a route of travel for a vehicle according to certain embodiments of the invention.

FIG. 8 is flow diagram illustrating an example of the operation 200 of the removable dashboard instrument system 10 in obtaining information to determine terrain information and provide of travel for a vehicle 12. As shown, the operation 200 includes, at step 202, securing the portable communications device 14 to a calibration location on the vehicle 12. The calibration location may include an exterior portion of the vehicle 12 that allows a video and/or photographic camera of the portable communications device 14 to view the terrain that the vehicle is traveling along. For example, according to embodiments in which the vehicle 12 is a rider mover, the portable communications device 14 may be mounted to a hood of the rider mower or other portion of the riding mower that allows the camera of the portable communications device 14 to view the terrain that vehicle 12 is traveling along, is approaching, and/or has already past. According to such embodiments, the portable communications device 14 may be connected to the securement mechanism 28 or a second securement mechanism that allows the portable communications device 14 to view and record images of the terrain. For example, according to certain embodiments, the portable communications device 14 may be secured to a second securement mechanism that includes a goose neck mount that secures the portable communications device 14 to the vehicle 12 while also allows for adjustment of the orientation of the portable communications device 14. At steps 204 and 206, the portable communications device 14 and vehicle 12 may be powered on, if not already in an on condition. At step 208, the portable communications device 14 establishes a communication link with the sensors 52, such as, for example, diagnostic sensors, of the vehicle 12. At step 210, the portable communications device 14 is switched to a calibration mode. According to certain embodiments, when in the calibration mode, the portable communications device 14 may acquire information, such as that discussed below, that sis used by the portable communications device 14 to determine a path of travel for the vehicle 12. Thus, while in the calibration mode, portable communications device 14 may be acquiring information about the surrounding operating environment.

At step 212, the user navigates the vehicle 12 around the perimeter of an area in which the vehicle 12 is to travel. For example, according to embodiments in which the vehicle 12 is a riding mower, at step 212, the vehicle 12 may be maneuvered around the perimeter of the yard. While the vehicle 12 is moved around the yard, the portable communications device 14 may be recording information regarding the terrain upon which the vehicle is traveling. For example, the portable communications device 14 may be recording video or pictures of the terrain that may provide information regarding the slope or curvature of portions of the terrain. The portable communications device 14 may also be configured to derived navigational information, such as information regarding direction or orientation of the portable communications device 14 and/or vehicle 12. Such information may provide an indication of the distance and boundaries that the vehicle 12 is to travel, as well as information regarding slopes and/or curvatures in the terrain at particular locations. The vehicle 12 may also include sensors 52 that are in communication with the portable communications device 14 and that provide information to the portable communications device 14 regarding characteristics of the terrain, such as, for example, slope and curvature, among others. For example, according to certain embodiments, the vehicle 12 and/or the portable communications device 14 may include an accelerometer 17 that is used to communicate information used in determining information regarding the terrain in which the vehicle 12 is being operated. Additionally, according to certain embodiments, during step 212, the portable communications device 14 may receive positional information for the GPS that the portable communications device 14 may use to identify the location of the perimeter of the terrain and to mark the location of particular characteristics, such as characteristics detected by the sensors 52 or derived by the portable communications device 14.

Additionally, at step 212, the vehicle 12 may also be maneuvered around obstacles within the perimeter to indicate locations where the vehicle 12 cannot, or is not to, travel within the perimeter. Such obstacles may include, for example, trees, rocks, water, and structures, such as buildings, among other obstructions.

At step 214, the navigation and/or terrain information obtained during step 212 may be recorded and stored within the memory of the portable communications device 14. Such storing may begin before, during, or after, step 214. Additionally, such storing may occur at intervals during step 212, such as, for example, during certain time intervals.

At step 216, using the navigational data obtained in step 212, the portable communications device 14 may calculate a route of travel for the vehicle 12. According to certain embodiments, the route may be calculated using a software application that has been downloaded to the portable communication device and that is executed by the controller 54, such as by the processor 56, of the portable communications device 14. The route calculated may consider recorded navigational data, such as, for example, the slope and/or curvature of the terrain, based in determining the route of travel, as well as characteristics of the vehicle 12, such as the center of gravity. Additionally, the route of travel may be determined based on the predicated safest, fastest, and/or most efficient route. For example, according to embodiments in which the vehicle 12 is a riding mower, the route calculated may be the predicted fastest route for cutting the grass within the perimeter.

At step 218, the optimal route determined at step 216 may be stored on the controller 54 of the portable communications device 14 and/or the controller 50 of the vehicle 12. The portable communications device 14 may also no longer be in the calibration mode, but instead return to a normal mode in which the portable communications device 14 may display information to the user regarding the terrain, among other information. At step 220, the portable communications device 14 may be repositioned from the location used at step 202 to a location that improves the ability of the user of the vehicle 12 to view the display 16, such as, for example, in the location shown in FIG. 1. At step 222, while the user is operating the vehicle 12 along the route provided from step 216, the portable communications device 14 may record the duration, or elapsed time, required to complete the route provided at step 216. The time required to complete the route provided from step 218 may be used by the route application or software to evaluate the route provided from step 218. At step 224, the route application or software may provide feedback to the user of the vehicle 12 reflecting how well the actual travel path of the vehicle 12 followed the route provided from step 218, as well as allow for feedback from the user regarding the route provided from step 218. At step 226, the route application or software may evaluate the route provided at step 218 from information or data acquired from at least steps 222 and 224 to evaluate whether to adjust any portion, or all, of the route provided by step 218. The controller 54 of the portable communications device 14 and/or the controller 50 of the vehicle 12 may then save the route provided at step 218, or the adjusted/modified route as a result of steps 224 and 226, for future travel of the vehicle 12.

While the apparatus has been described with reference to preferred embodiments, it will be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An instrument system for a motorized vehicle comprising:
   a portable communication device comprising:
      a receiver configured to receive information regarding operation of the motorized vehicle from a vehicle transmitter;
      a display configured to display the information received by the receiver; and
      a controller having a processor, the processor configured to control the display of the information received by the receiver;
   wherein the portable communication device is configured to record terrain information, the terrain information comprising one or more of:
      the received information regarding operation of the motorized vehicle, and images captured by a camera during operation of the motorized vehicle;
   and wherein the processor is configured to determine a course of travel for the motorized vehicle based on the recorded terrain information and information from a Global Positioning System for display at the display.

2. The instrument system of claim 1, wherein the portable communication device comprises an accelerometer that is configured to provide information relating to the rate of travel of the motorized vehicle, and wherein the processor controls the display of the information relating to the rate of travel of the motorized vehicle at the display.

3. The instrument system of claim 1, wherein the portable communication device comprises a memory that is configured to record the received information, and wherein the controller is configured to apply the recorded information to provide information regarding the maintenance of the vehicle.

4. The instrument system of claim 1, wherein the portable communication device is a smartphone.

5. The instrument system of claim 1, wherein the portable communication device is configured to receive information from a remote server relating to the operation of motorized vehicle and display at least a portion of the information from the remote server on the display.

6. The instrument system of claim 1, wherein the processor is configured to perform calculations on the received information to derive operational data, and wherein the operational data comprises at least some of the information that is displayed on the display.

7. The instrument system of claim 1, wherein processor is configured to execute an instrument application that provides sector information regarding the terrain on which the motorized vehicle is being operated to a display.

8. The instrument system of claim 1, comprising a securement mechanism configured to secure the portable communication device to the motorized vehicle.

9. The instrument system of claim 8, comprising a shield configured to cover at least a portion of the portable communication device when the portable communication device is secured to the motorized vehicle.

10. The instrument system of claim 8, wherein the securement mechanism comprises a housing having an interior portion and an outer portion, the interior portion configured to receive the insertion of the portable communication device.

11. The instrument system of claim 1, wherein the motorized vehicle comprises a dashboard, wherein a pocket is disposed within the dashboard, the pocket configured to receive the insertion of at least a portion of the portable communication device.

* * * * *